United States Patent [19]

Watanabe

[11] Patent Number: 5,142,175

[45] Date of Patent: Aug. 25, 1992

[54] MAGNETIC BEARING SYSTEM

[75] Inventor: Katsuhide Watanabe, Kanagawa, Japan

[73] Assignees: Ebara Corporation, Tokyo; Ebara Research Co., Ltd., Kanagawa, both of Japan

[21] Appl. No.: 758,517

[22] Filed: Sep. 6, 1991

Related U.S. Application Data

[63] Continuation of Ser. No. 649,369, Jan. 31, 1991, abandoned, which is a continuation of Ser. No. 422,480, Oct. 17, 1989, abandoned.

[30] Foreign Application Priority Data

Oct. 21, 1988 [JP] Japan ................................ 63-266890
Oct. 21, 1988 [JP] Japan ................................ 63-266891

[51] Int. Cl.$^5$ .............................................. H02K 7/09
[52] U.S. Cl. ................................. 310/90.5; 310/68 B; 310/112
[58] Field of Search ................ 310/90.5, 112, 114, 310/254, 261, 105, 68 B, 67 R, 154; 324/207.11

[56] References Cited

U.S. PATENT DOCUMENTS

| | | |
|---|---|---|
| 3,650,581 | 3/1972 | Boden . |
| 3,823,990 | 7/1974 | Gilinson ............................ 310/90.5 |
| 3,955,858 | 5/1976 | Poubeau ............................ 310/90.5 |
| 4,088,379 | 5/1978 | Perper ................................ 310/90.5 |
| 4,211,452 | 7/1980 | Poubeau ............................ 310/90.5 |
| 4,312,628 | 1/1982 | Yamamura ......................... 310/90.5 |
| 4,634,191 | 1/1987 | Studer . |
| 4,700,094 | 10/1987 | Downer ............................. 310/90.5 |

FOREIGN PATENT DOCUMENTS

| | | | |
|---|---|---|---|
| 0136865 | 4/1985 | European Pat. Off. ........... | 310/90.5 |
| 0311122 | 12/1989 | European Pat. Off. . | |
| 57-30998 | 7/1982 | Japan . | |
| 0137740 | 8/1982 | Japan ................................. | 310/90.5 |
| 58-54220 | 3/1983 | Japan . | |

OTHER PUBLICATIONS

Marks' Standard Handbook for Mechanical Engineers (2 pages) by E. A. Avallone et al.; 9th Ed., McGraw Hill Bk. Co.; New York—Toronto; Jan. 1990.
"Ebara Jiho" No. 138 (1987-1989) pp. 7-11.
Philips Technical Review, vol. 41, No. 11/12, 1983/1984, pp. 348-361, Eindhoven NL; E. M. H. Kamerbeek: "Magnetic Bearings".
Patent Abstracts of Japan, vol. 10, No. 130 (M-478) (2187), May 14, 1986; & JP-A - 60256620 (Koko Ucho Gijutsu Kenkyusho) Dec. 18, 1985.
Japanese Patent Public Disclosure No. 59-50220, Mar. 1987.
English Abridgement of the above Official Gazette, Japanese P.A. Disc. 59-50220 Mar. 1984.

Primary Examiner—R. Skudy
Attorney, Agent, or Firm—Nikaido, Marmelstein, Murray & Oram

[57] ABSTRACT

A system for supporting a rotor without contact with a stator comprising a magnetic bearing apparatus mounted on the stator and including a controlling magnet means fixed to the stator, a non-controlling magnetic pole fixed to the stator, a biasing magnetic poles sandwiched between the controlling magnet and the non-controlling magnetic pole, and a rotor magnetic pole fixed to the rotor to enable the magnetic path of a biasing flux to run in a plane which includes the longitudinal axis of the stator. The non-controlling and rotor magnetic poles may have teeth facing each other.

28 Claims, 16 Drawing Sheets

5,142,175

MAGNETIC BEARING SYSTEM

This application is a continuation of application Ser. No. 649,369, filed Jan. 31, 1991, now abandoned, which is a continuation of application Ser. No. 422,480 filed Oct. 17, 1989, now abandoned.

BACKGROUND OF THE INVENTION

1. Field of the Invention

This invention relates to a magnetic bearing system for a turbo-machine or the like having a relatively lightweight rotor and, particularly, to a magnetic bearing system for supporting such a rotor in a non-contact and stable state.

2. Description of the Prior Art

Magnetic bearing systems for supporting rotors are well known. An example of a conventional magnetic bearing system will be described with reference to FIG. 1.

FIG. 1 is a cross sectional view showing the structure of a spindle supporting apparatus provided with a conventional axis-controlling magnetic bearing system of an inner rotor type. As shown, a rotor shaft 100 is rotatably supported in a casing 101 by a pair of radial magnetic bearings A, A and a thrust magnetic bearing B positioned adjacent to one of the radical magnetic bearings A. The rotor shaft 100 is rotatably driven by a motor M disposed in the mid-portion of the casing 101 and comprising a motor stator 103 and a motor rotor 102. Each of the radial magnetic bearings A includes a radial bearing stator yoke 104 provided with a stator coil 105, a radial bearing yoke 106 mounted on the rotor shaft 100 and radial displacement sensors 107. The thrust magnetic bearing B also includes thrust bearing stator yoke 108 provided with stator coils 109 and a thrust bearing yoke 110 mounted on the rotor shaft 100. Further, the reference numeral 111 in FIG. 1 refers to a rolling bearing for use in an emergency.

The disposition of the magnetic poles of the stators 104 and the displacement sensors 107 is shown in FIGS. 2 and 3. The magnetic attractive forces act in two orthogonally intersecting X- and Y-directions. The position of the rotor shaft 100 in these two axial directions is detected by the displacement sensors 107a and 107b positioned in the X-and Y-directions, respectively, as shown in FIG. 3, and the magnetic attractive forces are controlled on the basis of the signals detected by the sensors. The position in the X-direction of the rotor shaft 100 is regulated by allowing control currents on the basis of the outputs of the displacement sensors 107a in the X-direction to flow through the stator coils 105A and 105C to control the magnetic attractive forces generated between the radial bearing stators 104 and the radial bearing yoke 106.

FIGS. 4 and 5 are block diagrams showing the arrangements of the control circuits for flowing control currents through the stator coil 105A-105D. In the control circuit of FIG. 4, the output from the radial displacement sensor 107 is supplied concurrently with the current from a bias power source 112 through a phase compensating circuit 113 to a power amplifier 114 to permit a control current generated by the power amplifier 114 to flow to the stator coils 105A, 105B, 105C and 105D.

In the control circuit of FIG. 5, the signal supplied from the radial displacement sensor 107 is supplied to the phase compensating circuit 113, the output and inverse output of which is then added to a constant voltage $V_R$ and the output is then respectively input to linear detection circuits 115a and 115c. The outputs thereof are then amplified by power amplifiers 114a and 114c to allow constant currents to flow through the stator coils 105A and 105C.

In the above-described conventional magnetic bearing system, problems are encountered in that the separate provision of the active type radial magnetic bearings A, A and the thrust magnetic bearing B requires an increase in the number of shafts to be controlled in order to support the rotor and in addition, the mounting of the thrust yoke 110 bearing system on the rotor 100 makes assembly and disassembly of the apparatus complicated.

In the magnetic bearings as shown in FIG. 1, in order to linearize between the magnetic attractive force and the current, a constant current is usually caused to flow through each of the stator coils 105A-105D, thereby applying a constant magnetic flux, that is, a biasing magnetic flux is applied between the radial bearing stator 104 and the radial bearing yoke 106. The same can be said with regard to the thrust bearing. As shown in FIG. 2, the magnetic flux Φ generated by each of the stator coils 105A-105D passes through a circular magnetic path formed between the radial bearing stator 104 and the radial bearing yoke 106 in a plane perpendicular to the rotor 100 and the stator. As a result, a change in strength of the magnetic flux occurs in the radial bearing yoke 106 in the circumferential direction ①-②-③-④, as shown in FIG. 6. Accordingly, an eddy current is generated on the side of the rotor 100 (the surface of the radial bearing yoke 104) as the rotor 100 rotates across the changing magnetic flux.

Such an eddy current increases as the number of revolutions of the rotor 100 increases. The generation of such an eddy current causes problems of heat generation and internal damping in the rotor 100, thus the rotor fails to be stably supported. A countermeasure generally employed was to use silicon steel plates for the magnetic poles or to reduce the biasing magnetic flux as much as possible in order to minimize the generation of the eddy current, but it has been found that suppression of the eddy current by such a method is still insufficient and that the reduction in the biasing magnetic flux adversely affects the rigidity of the magnetic bearing.

SUMMARY OF THE INVENTION

The present invention has been made to solve the problems as described above.

A general object of the invention is to provide a system for rotatably supporting a rotor relative to a stator by using a new and improved magnetic bearing apparatus.

One of the specific objects of the invention is to provide a system for rotatably supporting a rotor relative to a stator by using a magnetic bearing apparatus which inhibits the generation of an eddy current in the rotor.

Another of the specific objects of the invention is to provide a system for rotatably supporting a rotor relative to a stator by using a magnetic bearing apparatus which can be easily assembled and disassembled and is capable of stably supporting the rotor and can be produced at a low cost.

In order to achieve these objects, a system according to the present invention comprises a motor for rotating the rotor relative to the stator and a magnetic bearing apparatus mounted on the stator for rotatably supporting the rotor relative to the stator without any contact with it. The magnetic bearing apparatus comprises:

a controlling magnet means fixed to a peripheral portion of the stator for generating a magnetic flux to exert a magnetic force on the rotor so as to support the rotor in a neutral position;

a non-controlling magnetic pole means fixed to the peripheral portion of the stator;

a biasing magnetic pole means fixed to the stator and positioned between the controlling magnetic means and the non-controlling magnetic pole means for generating and supporting a biasing magnetic flux to the controlling magnet means to linearize control of the position of the rotor; and a rotor magnetic pole means fixed to the rotor to face the controlling magnet means and the non-controlling and biasing magnetic pole means, thereby forming a magnetic path for the biasing flux running in a plane which includes the longitudinal axis of the stator.

In one embodiment, the biasing magnetic pole means is sandwiched between the controlling magnet means and the non-controlling magnetic pole means. This enables the biasing magnetic flux to be uniformly distributed in the circumferential direction of the rotor, thereby inhibiting the generation of an eddy current in the rotor when it rotates. This causes a reduction in the heat generated in the rotor and enables stable support of the rotor to be achieved.

In another embodiment, the non-controlling magnetic pole means has at least two first teeth on one surface thereof and the rotor magnetic pole means has at least two second teeth on one surface thereof to face the first teeth of the non-controlling magnetic pole means. The controlling magnet means and the non-controlling, biasing and rotor magnetic pole means and the gap between the first and second teeth form a magnetic path which causes the biasing magnetic flux run in a plane which includes the longitudinal axis of the stator. This enables the magnetic flux between the facing first and second teeth to be utilized to recover longitudinal displacement of the rotor. Accordingly, a thrust bearing, which is usually employed in a conventional magnetic bearing, is unnecessary in constructing the system, and a decrease in the number of control axes used can be achieved. As a result, it is possible to provide a magnetic bearing apparatus which is cheap, compact and easily assembled and disassembled.

The controlling magnet means may comprise a controlling electromagnet positioned perpendicular to the radial direction of the stator to generate a controlling magnetic flux and a controlling magnetic pole means for receiving the controlling magnetic flux so as to exert a radial magnetic attractive force on the rotor. The controlling magnetic pole means and the non-controlling magnetic pole means may be annular and provided so as to put the biasing magnetic pole means therebetween. The controlling electromagnet may be formed such that the cross section thereof includes a straight side and an arc-shaped side connecting the ends of the straight side. The biasing magnetic pole means may comprise an annular permanent magnet or an annular electromagnet.

The system of the present invention may further include a means for sensing a radial displacement of the rotor.

The above and other objects and features of the invention will become clearer from a consideration of the following description to be made in connection with the accompanying drawings wherein certain examples are illustrated by way of example.

DESCRIPTION OF THE PREFERRED EMBODIMENTS

Figure 7:
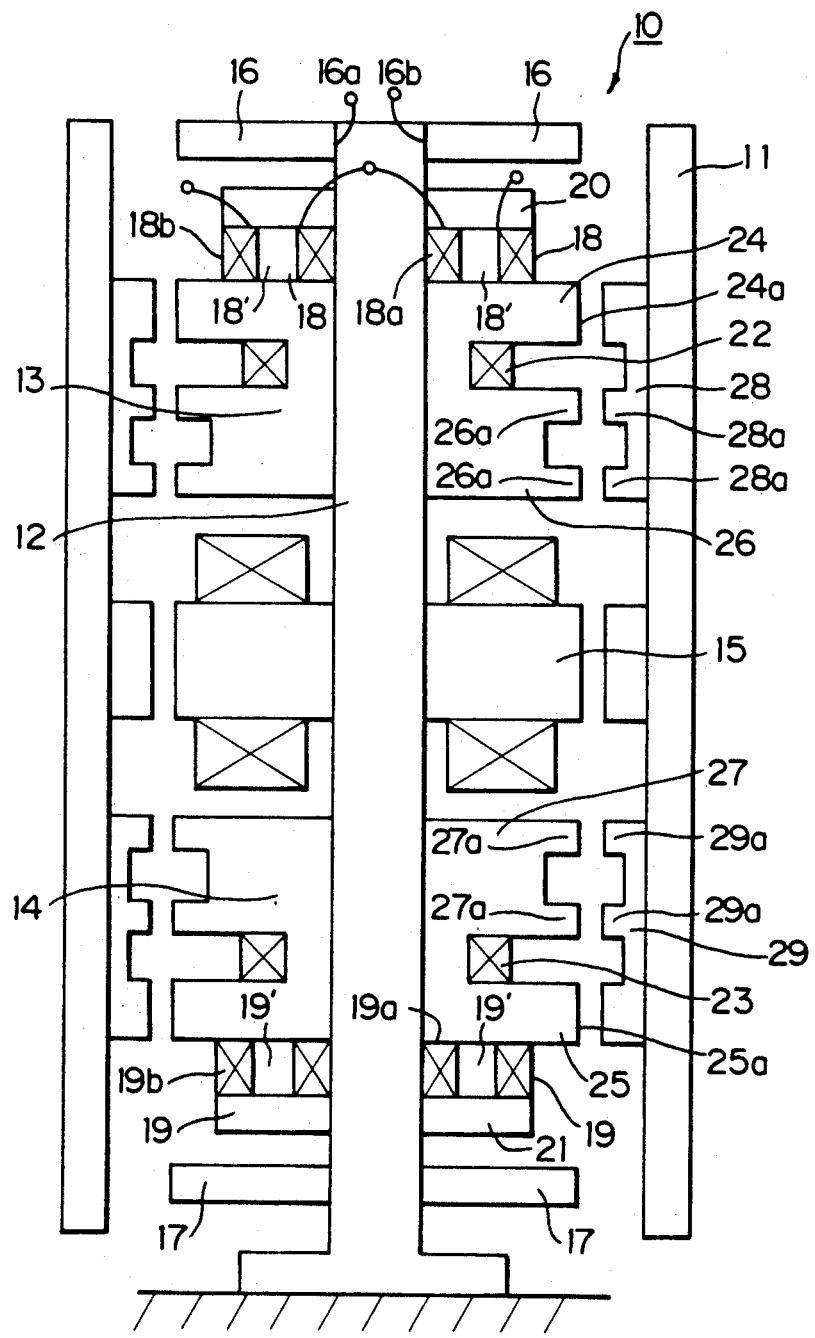
FIG. 7 is a cross section of an embodiment of a magnetic bearing system according to the present invention.

FIG. 7 is a section taken along a plane including a control axis in one direction of an embodiment of a magnetic bearing apparatus in accordance with the present invention.

In this figure, a magnetic bearing system 10 is used to support a rotor 11 in a non-contact state relative to a fixed shaft 12. Thus, the rotor 11 is supported at two points by magnetic bearings 13 and 14 and rotated about the fixed shaft 12 by a motor 15. The radial position of the rotor 11 is detected by a pair of displacement sensors 16 and 17 disposed on one control axis to face each other. The displacement sensors 16, 17 are positioned adjacent to the respective magnetic bearings 13, 14.

The magnetic bearings 13, 14 respectively include electromagnets 18, 19 comprising electromagnet yokes 18', 19' for controlling the radial magnetic attractive forces, yokes 20, 21, biasing magnets 22, 23 comprising annular electromagnets or permanent magnets for providing a biasing magnetic flux, controlling magnetic poles 24, 25, non-controlling magnetic poles 26, 27 and rotor magnetic poles 28, 29 fixed to the rotor 11. The non-controlling magnetic poles 26, 27 are formed on the outer surfaces with two or more teeth 26a and 27a. The rotor magnetic poles 28, 29 are provided with teeth 28a and 29a which face the teeth 26a and 27a.

Figure 8:
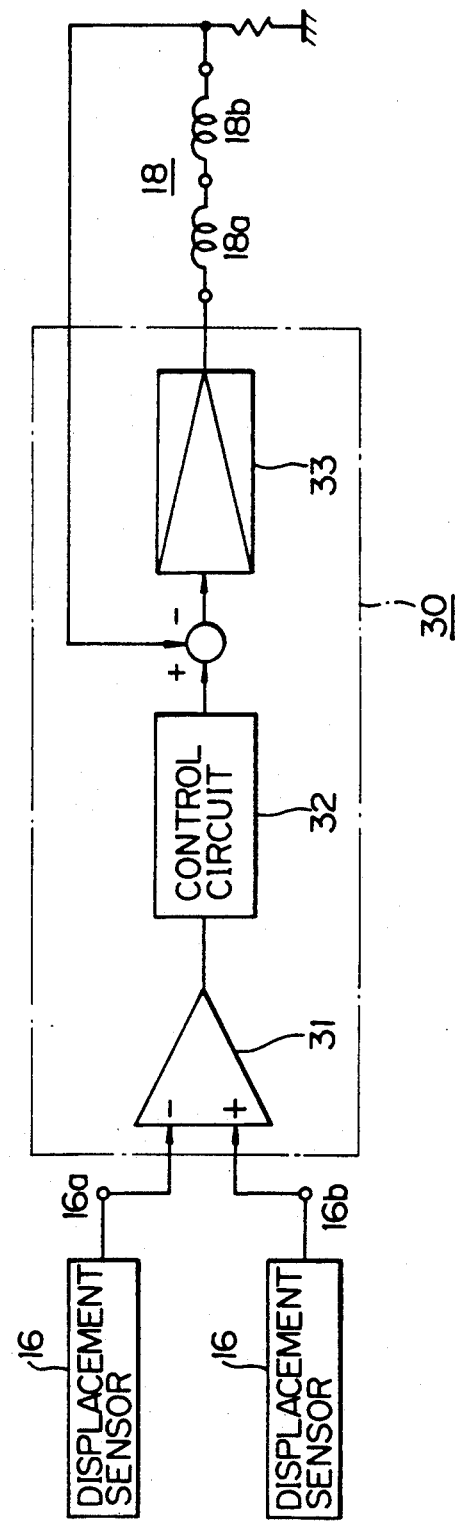
FIG. 8 is a block diagram of a control device used for the magnetic bearing apparatuses in FIG. 7.

FIG. 8 is a block diagram showing a controller 30 for controlling the electromagnet 18 of the magnetic bearing apparatus 13. The output signals 16a, 16b of the displacement sensors 16 are changed to a displacement signal by a differential amplifier 31. The displacement signal is fed to a control circuit 32 which then phase-compensates the displacement signal and supplies the phase-compensated signal to a current amplifier 33. The current amplifier 33 feeds a current to coils 18a, 18b connected in series in the electromagnet 18, and controls the magnetic attractive force generated by the electromagnet 18 in response to the current. The control device for controlling the magnetic bearing 14 also has the same circuitry, and thus the description thereof will be omitted herein.

Figure 9:
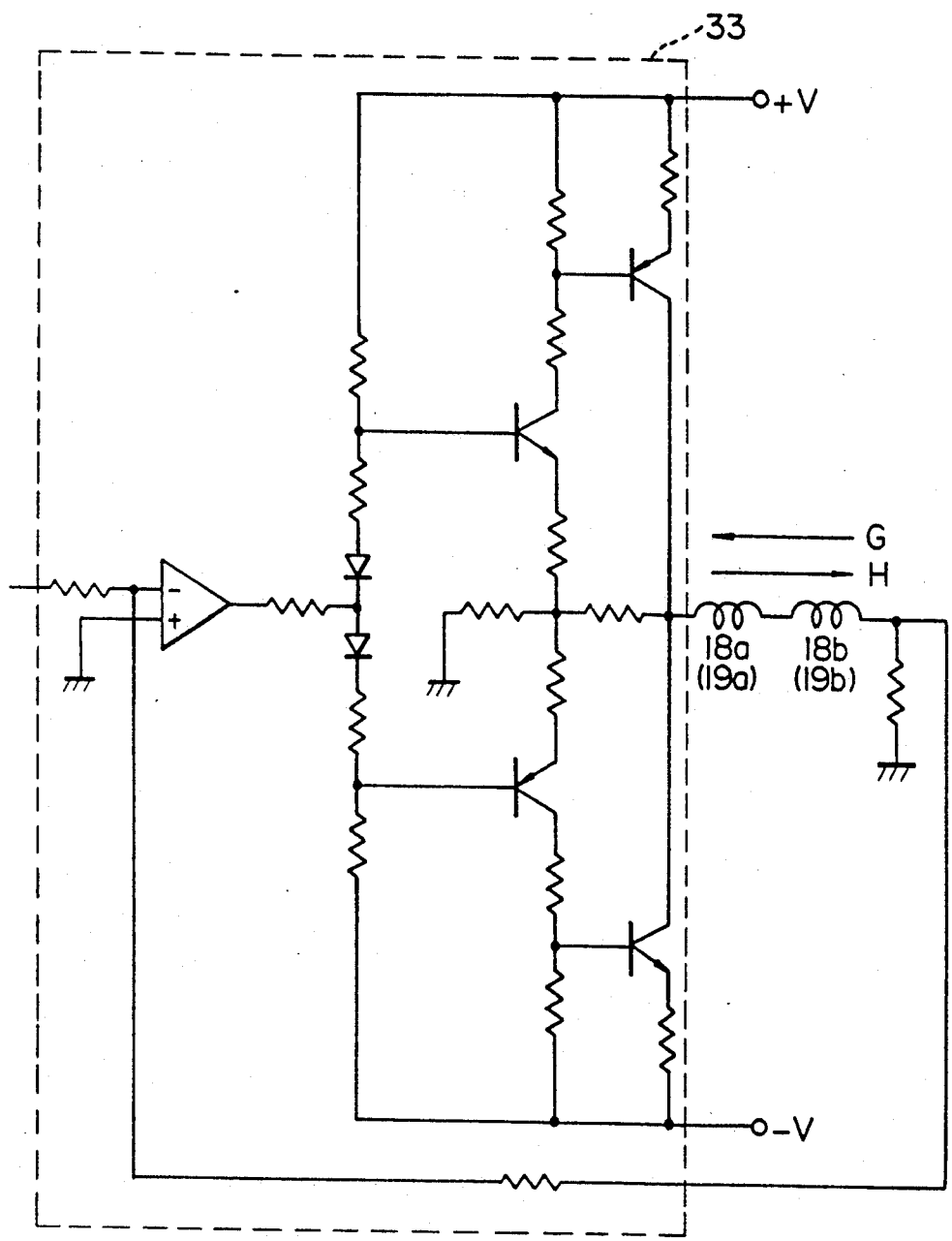
FIG. 9 is circuit diagram of a current amplifier used for driving the control coils of the magnetic bearing apparatuses in FIG. 7.

Since the facing coils 18a (19a) and 18b (19b) are connected in series, the current amplifiers 33 for directing currents to the electromagnets 18, 19 can be embodied as shown in FIG. 9 as a push-pull type current amplifier having transistors, resistors, diodes, and a differential amplifier. This push-pull type current amplifier 33 acts to change the direction G or H of the flow of current through the coil 18a (19a) and the coil 18b (19b) of the electromagnet 18 (19), and needs a limited number of circuit components, thereby reducing the costs thereof and enhancing the reliability of the circuit. FIG. 9 shows a current amplifier 33 of the known type having transistors, diodes, and resistors (not identified) for driving the control coils of the magnetic bearing apparatus of FIG. 7.

Figure 10A:
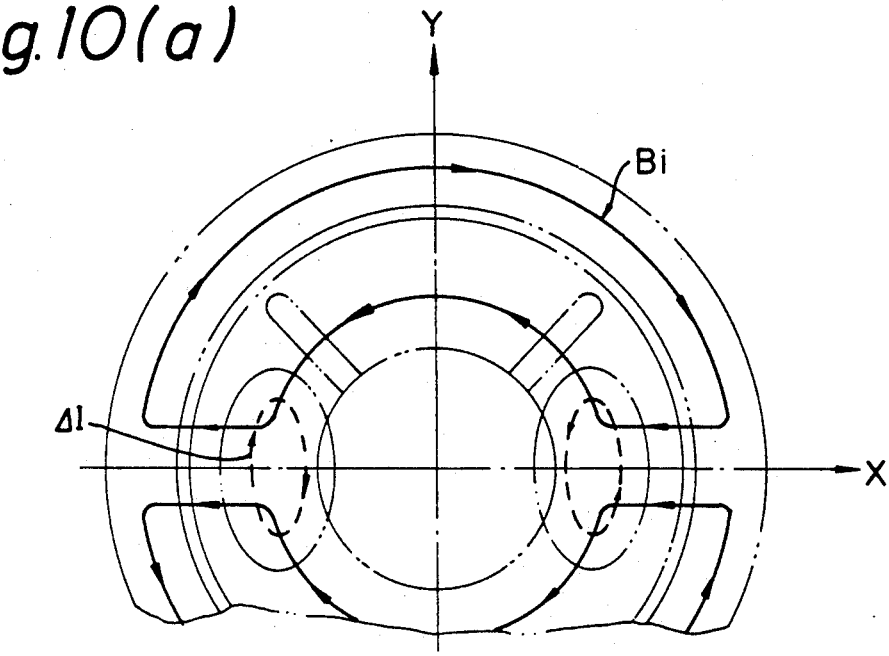
FIG. 10($a$) and ($b$) are used for explaining the operation of the magnetic bearing apparatuses of the invention, FIG. 10($a$) being a transverse section of the magnetic bearing apparatus, showing the magnetic path of the control magnetic flux and FIG. 10($b$) being a partly sectional perspective view of the magnetic bearing apparatus.
Figure 10B:
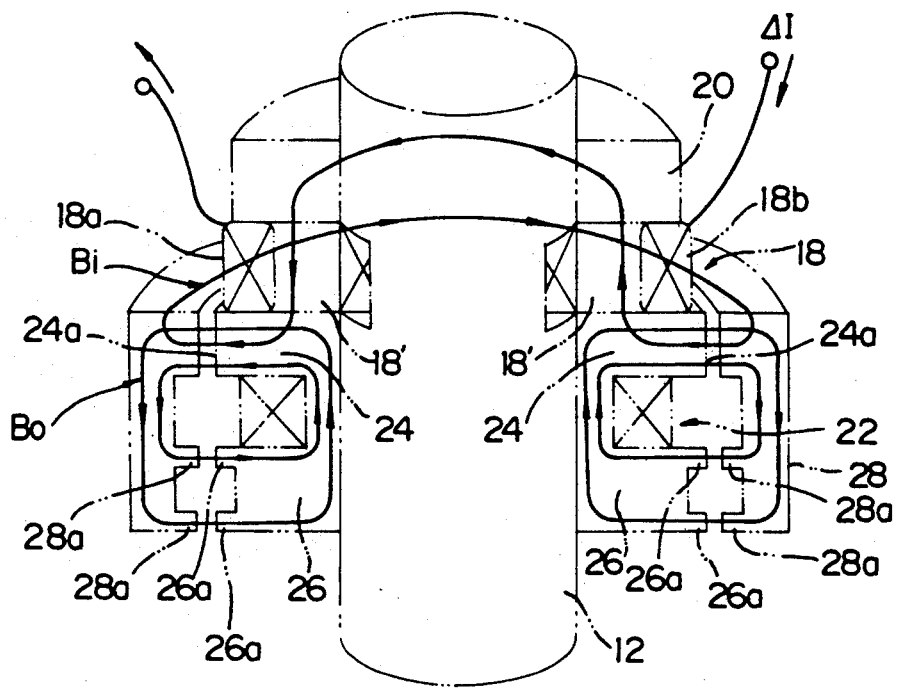

FIGS. 10(a) and 10(b) are illustrations showing the structure and operation of the magnetic bearing 13, which is shown in FIG. 7, FIG. 10(a) being a plan view thereof and FIG. 10(b) being a partly fragmental perspective view. In the magnetic bearing 13, there are separately provided an electromagnet 18 for generating controlling flux for controlling the magnetic attractive force and a biasing magnet 22 comprising an electromagnet or permanent magnet for generating a biasing flux. It is therefore unnecessary for the controller 30 to be provided with any circuit to provide a bias for linearizing the magnetic attractive force. In order to generate the controlling flux, the electromagnet 18 is provided with electromagnet coils 18a, 18b on the same control axis. The controlling flux Bi flows along a closed-loop magnetic path as shown in FIG. 10(b), from the electromagnet coil 18a through a tooth 24a of the controlling magnetic pole 24, the magnetic pole 28 of the rotor 11 (see FIG. 7), a tooth 24a of the controlling magnetic pole 24 and the electromagnet coil 18b to the yoke 20. The biasing magnet 22 generating the biasing flux Bo forms a closed-loop magnetic path passing through a tooth 24a of the controlling magnetic pole 24, the rotor magnetic pole 28 of the rotor 11 of FIG. 7, the non-controlling magnetic pole 26 and the controlling magnetic pole 24.

Figure 11:
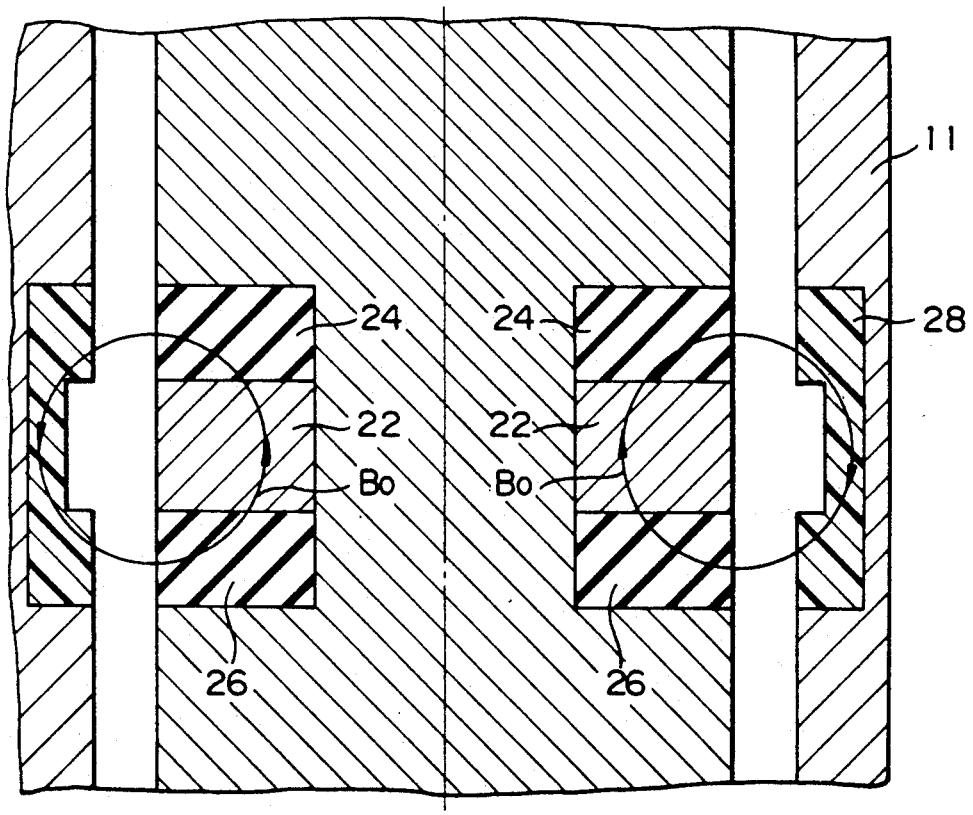
FIG. 11 is a simplified longitudinal section of the magnetic bearing in FIG. 7.
Figure 12:
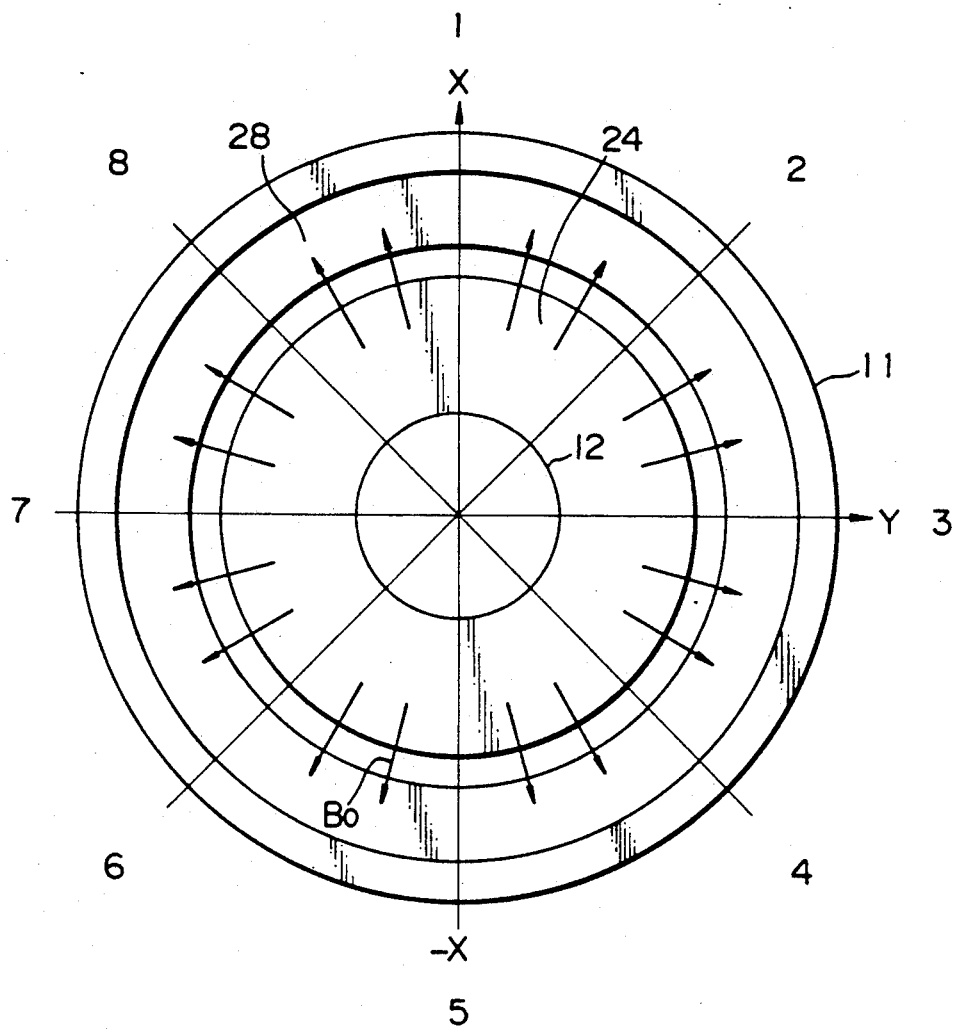
FIG. 12 is a transverse cross section of the magnetic bearing apparatus in FIG. 7 and shows a biasing magnetic flux flowing perpendicularly to the gap between the rotor and stator of the magnetic bearing apparatus.
Figure 13:
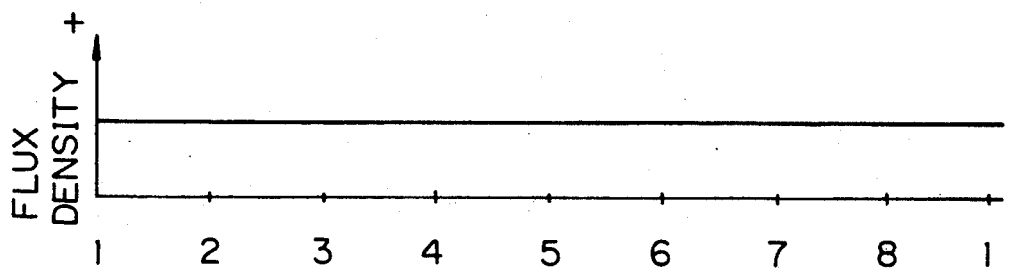
FIG. 13 shows a distribution of the biasing magnetic flux along the gap in FIG. 12.

It should be appreciated that the biasing flux Bo is radially generated by the biasing magnet 22 in a plane perpendicular to the central axis of the fixed shaft 12. FIG. 11 is a conceptional cross section of the magnetic bearing 13, and serves to explain why the biasing flux Bo is generated in a radial direction, as shown in FIG. 12. FIG. 11 shows, in simplified forms, the controlling magnetic pole 24 and the non-controlling magnetic pole 26 as circular magnetic poles positioned on both sides of the biasing magnet 22, and the rotor magnetic pole 28 as having radial protrusions on both sides to face the controlling and non-controlling magnetic poles, respectively. Since the biasing magnet 22 is sandwiched between the controlling and non-controlling magnetic poles 24, 26, the magnetic flux Bo from the electromagnet (or permanent magnet) 22 flows axially with respect to the fixed shaft 12 and radially with respect to the rotor 11 of FIG. 7, as shown in FIGS. 11 and 12. FIG. 13 is a graph of the flux density along the gap between the magnetic poles 24 and 28 shown in FIG. 12. The positions along the gap are indicated in FIGS. 12 and 13 by designations ①-⑧. Thus, the magnetic flux in the air gap between the magnetic poles 24, 26 of the fixed shaft 12 and the magnetic pole 28 of the rotor 11 of FIG. 7 are uniformly distributed in the circumferential direction, as shown in FIG. 13. As a result, no variation in the flux density appears in the magnetic pole 28 of the rotor 11 of FIG. 7 even when the rotor 11 rotates. This prevents an eddy current from being generated in the rotor 11, or, if generated, its subsequent reduction to an extremely low leve, whereby a magnetic bearing system can be achieved which is much more stable than any of the conventional types.

Figure 14:
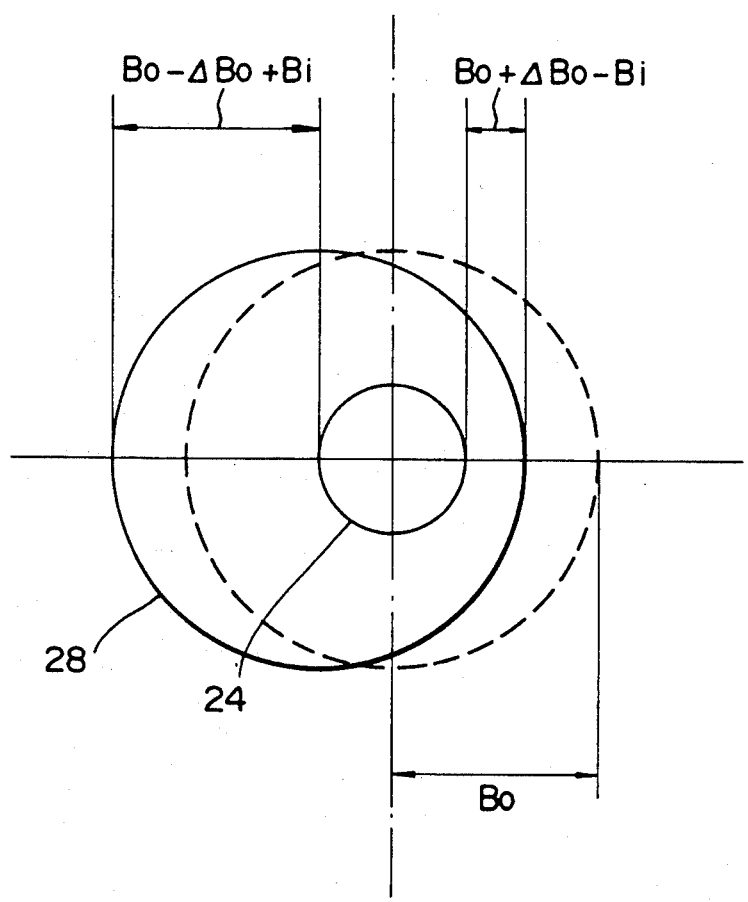
FIG. 14 is used for explaining how control of the magnetic bearing apparatus is linearized in accordance with the present invention.

Now, let us assume that when the rotor 11 of FIG. 7 is in its neutral position, the flux Bo is formed by the biasing magnet 22 (FIG. 14). If the rotor 11 is shifted leftward as shown in FIG. 14, the gap between magnetic pole 24 and the magnetic poles 28 becomes large on the left side of the fixed shaft 12 and the magnetic flux decreases by $\Delta$Bo. On the right side of the fixed shaft 12, the gap between the magnetic pole 24 and the magnetic pole 28 becomes small and the flux Bo increases by $\Delta$Bo. In order to eliminate such an increment and decrement $\pm\Delta$Bo of the flux, a current having the amount of ($\Delta$I) is supplied to the electromagnet coils 18a, 18b on the fixed shaft 12 to generate, on the left side of the air gap, a magnetic flux having the amount of (+Bi), and a current having the amount of ($\Delta$I) is supplied to the electromagnet coils 18a, 18b on the fixed shaft 12 to generate, on the right side of the air gap, a magnetic flux having the amount of (−Bi). Thus, the relation between the magnetic attractive force $F_c$ and the flux density Bi is linearized by the biasing flux Bo in the controlling magnetic pole 24, as shown by the following expression:

$$F_c = A/2\mu\{(Bo + \Delta Bo - Bi)^2 - (Bo - \Delta Bo + Bi)^2\}$$
$$= 2A/\mu(Bo\Delta Bo - BoBi)$$

where, A: area of the magnetic pole and μ: magnetic permeability of the gap. Since the structure and operation of the magnetic bearing 14 are substantially the same as those of the bearing 13, the description thereof will be omitted.

Figure 15:
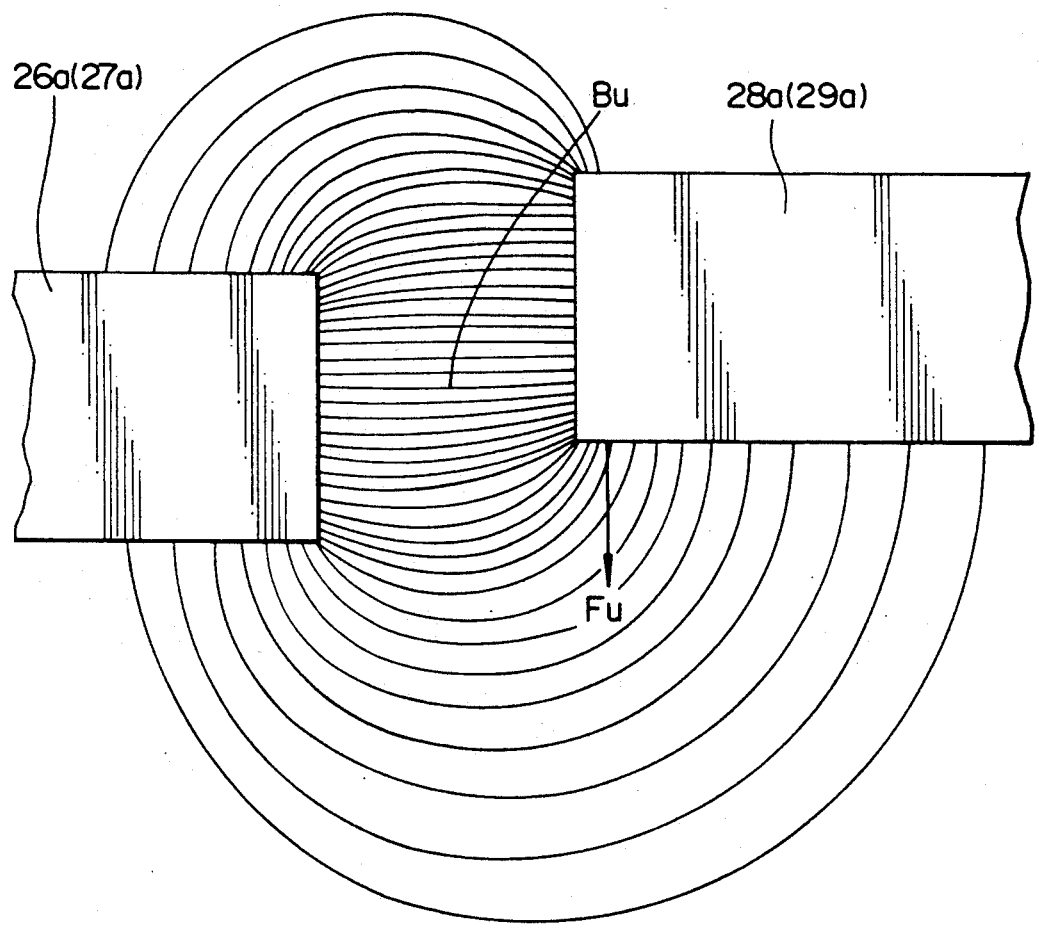
FIG. 15 is used for explaining how a force for recovering a longitudinal displacement of the rotor is generated in accordance with the present invention.

As explained above with reference to FIG. 10(b) and FIG. 15, the outer surface of each of the non-controlling magnetic poles 26, 27 has the teeth 26a, 27a and the inner surface of each of the rotor magnetic poles 28, 29 has the teeth 28a, 29a, such that the teeth 26a, 27a of the non-controlling magnetic poles 26, 27 face the teeth 28a, 29a of the rotor magnetic poles 28, 29, respectively. This arrangement serves to increase the flux density Bu between the teeth 26a, 27a and the teeth 28a, 29a. This results in the fact that even when the rotor 11 is shifted in the longitudinal axial direction, that is, in the thrust axis direction, flux in that direction is generated between the teeth 26a, 27a of the non-controlling magnetic poles 26, 27 and the corresponding teeth 28a, 29a of the rotor magnetic poles 28, 29, as shown in FIG. 15, thereby generating a recovery force Fu in the thrust axis direction. Thus, the rotor 11 can be passively supported in the thrust axis direction.

Figure 1:
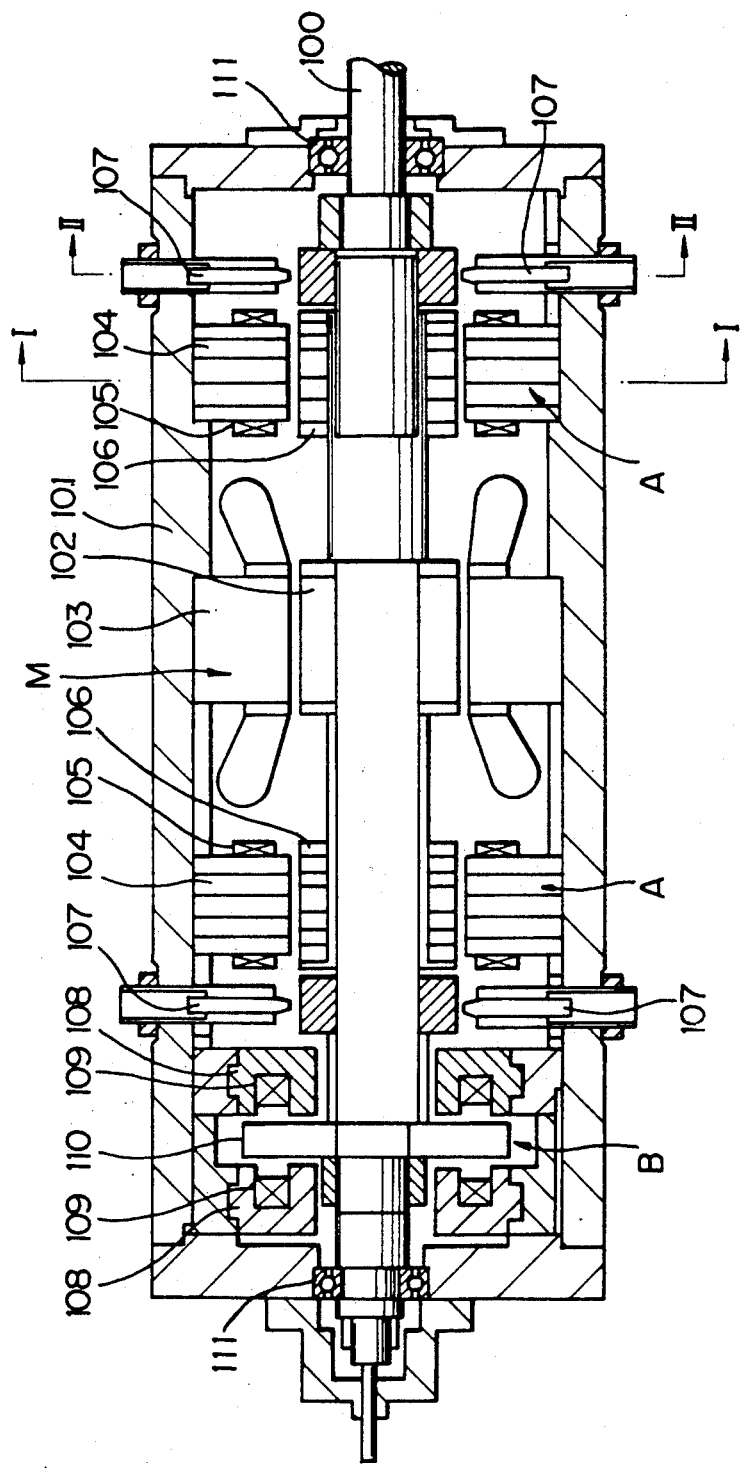
FIG. 1 is a side sectional elevation showing the structure of a spindle supporting apparatus provided with a conventional magnetic bearing apparatus of an axis control type.
Figure 2:
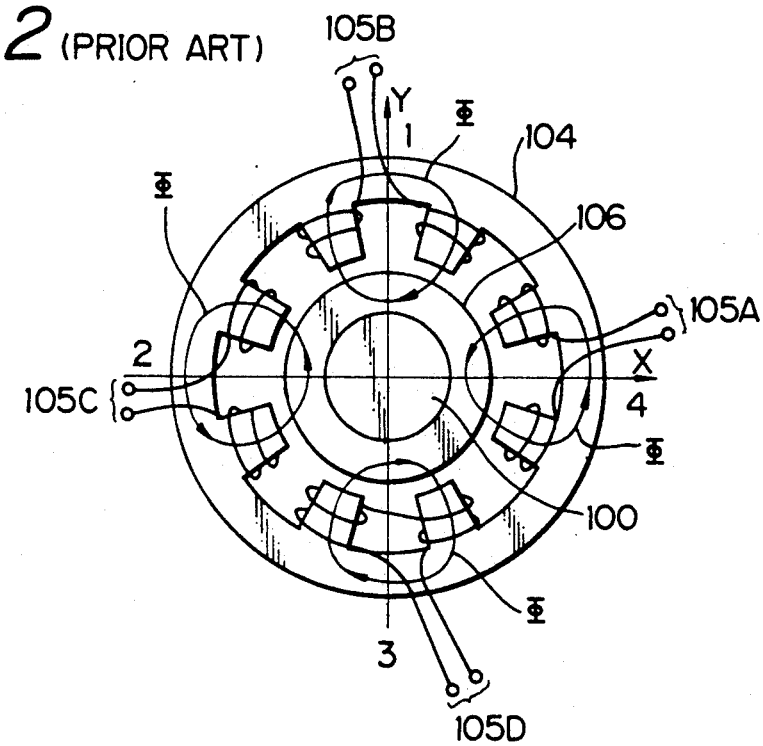
FIG. 2 is a cross section taken along a line I—I of FIG. 1, showing biasing magnetic flux passing through the magnetic bearing apparatus.
Figure 3:
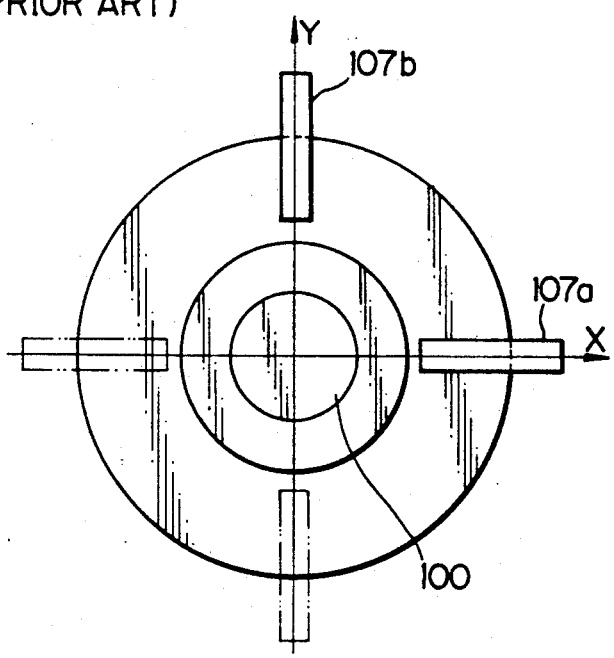
FIG. 3 is a cross section taken along a line II—II of FIG. 1.
Figure 4:
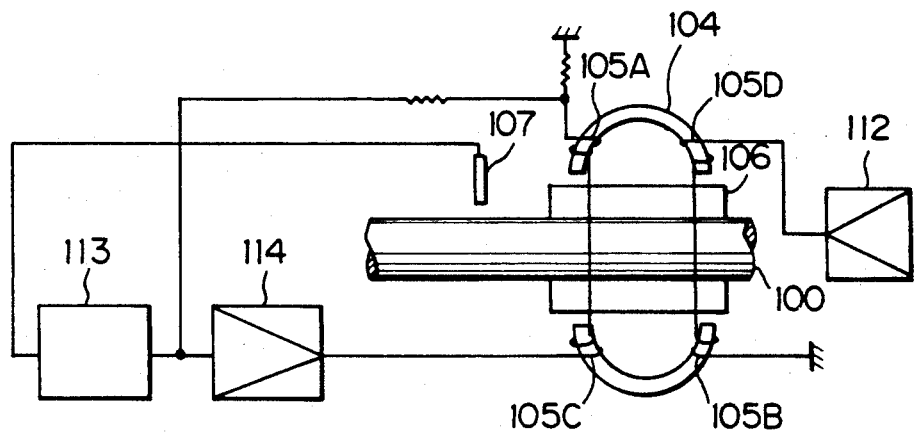
FIGS. 4 and 5 are circuit diagrams showing the arrangements of the control circuits for causing control current to flow through the stator coils.
Figure 5:
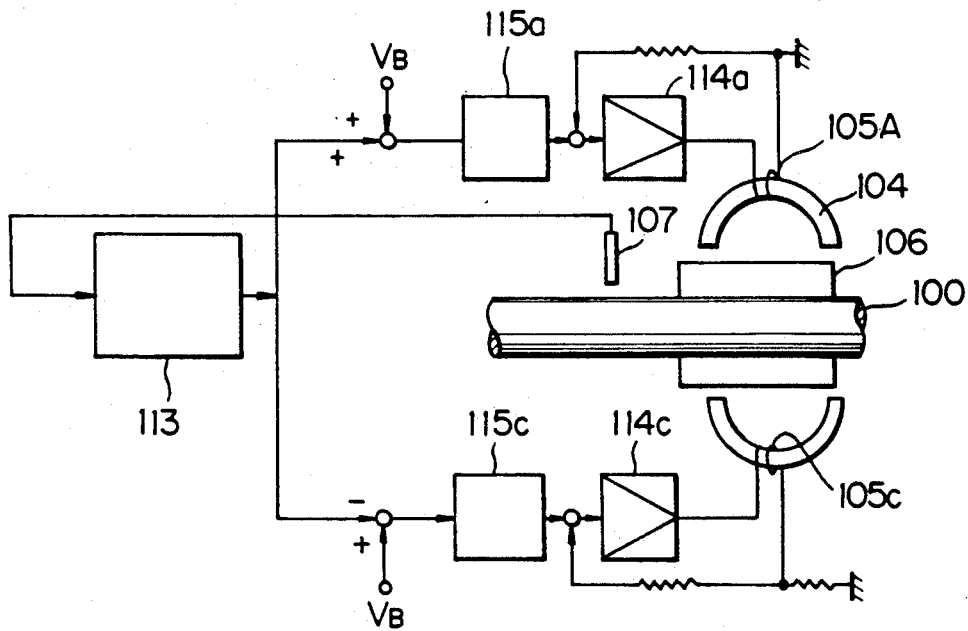
Figure 6:
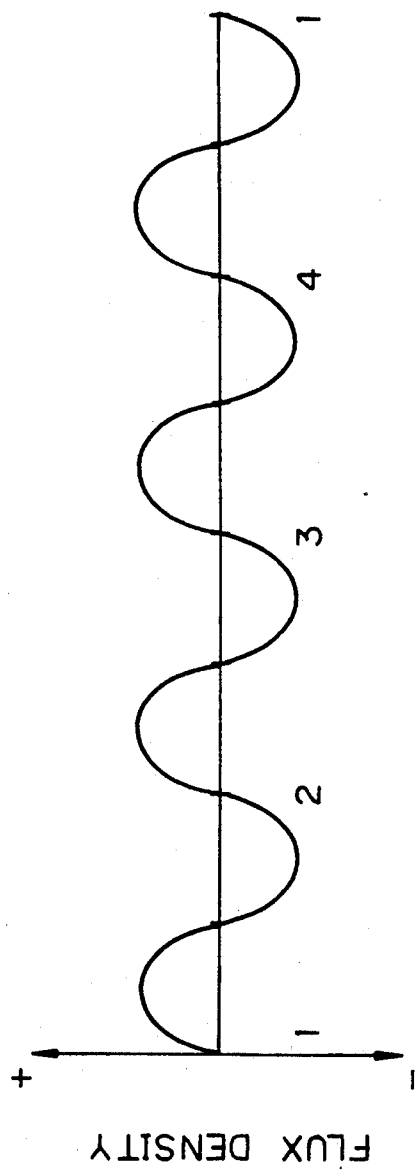
FIG. 6 is a graph showing a variation in flux density in the air gap of the magnetic bearing of FIG. 1.

As described above, the magnetic bearing system of this embodiment utilizes the biasing fluxes of the biasing magnets 22, 23 for linearizing the magnetic attractive force and for passively supporting the rotor 11 in the thrust axis direction. Thus, the rotor 11 can be stably supported only controlling the radial displacement of the rotor 11, so that a thrust disc, as required in the conventional magnetic bearing (the thrust bearing yoke 110 of FIG. 1, for example) is not required.

As shown in FIG. 10(b), moreover, since the magnetic fluxes generated by the biasing magnets 22, 23 pass through paths similar to those shown in FIG. 11, the fluxes passing through the air gaps between the controlling magnetic poles 24, 25 of the fixed shaft 12 and the rotor magnetic poles 28, 29 of the rotor 11 are uniformly distributed in the circumferential direction. Thus, the eddy current generated in the rotor 11 is suppressed to an extremely low level. FIG. 15 schematically shows flux lines between teeth 26a and 28a, which also represents flux lines between teeth (27a) and (29a). A force Fu is thereby generated on the teeth 28a (29a).

Figure 16A:
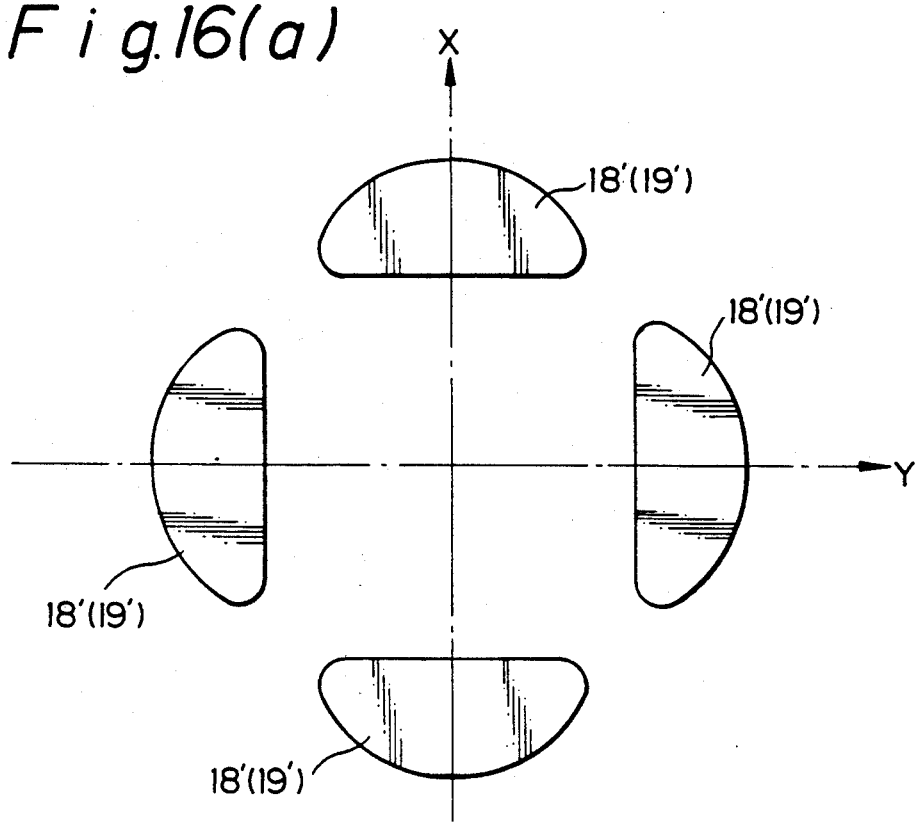
FIGS. 16($a$) and ($b$) are sectional and perspective views, respectively, of the electromagnet yokes of the magnetic bearing apparatuses in FIG. 7.
Figure 16B:
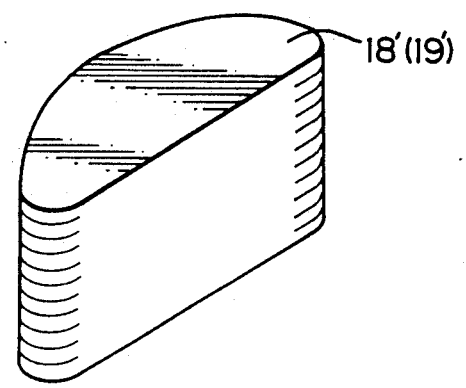

The electromagnets 18, 19 generating the controlling fluxes are disposed perpendicularly to the radial control axes, as shown in FIGS. 7 and 10(b), to reduce the radial size so that they can be applied in a case where there is a limitation on space in the radial direction of the fixed shaft 12. In such a case, the dimension of the cross-sectional area of the electromagnet yokes 18', 19' is also limited and saturation of the magnetic fluxes may be caused. To prevent saturation, the yokes 18', 19' are formed to have a sectional area including one straight side and one arcuate side, as shown in FIGS. 16(a) and 16(b). In this way, the surface area for the magnetic path can be increased in a limited space. Since it is difficult to make such electromagnet yokes from silicon steel plates, an easily shapable material such as magnetic soft iron, Permalloy or the like can be used. In the magnetic bearing system, the biasing magnetic fluxes are supplied by the biasing magnets 22, 23 consisting of electromagnets or permanent magnets. The flux density of these fluxes in the air gaps (where "T" refers to Tesla) are set to 0.4 (T)-0.6 (T) at the controlling magnetic poles 24, 25 and to 0.8 (T)-1.2 (T) at the non-controlling magnetic poles 26, 27. This makes it possible to control the flux densities generated by the electromagnets at the controlling poles 24, 25 in a range of $-0.5$ (T)$-+0.5$ (T) and a substantially saturated condition is achieved at the top end of the non-controlling magnetic poles 26, 27 to enhance the recovering forces in the thrust axis direction. Such a setting is achieved by using parameters such as the surface area of the poles, the length of the magnetic paths, the gap between the poles, the coercive force of the magnets, the remanent flux density (in the case of using permanent magnets), and the magnetomotive force (in the case of using electromagnets).

Figure 17:
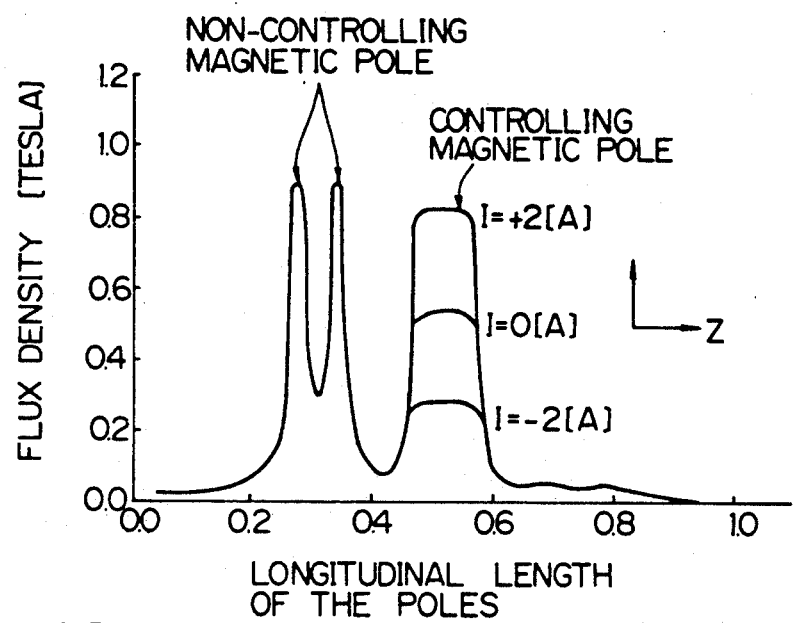
FIG. 17 is a graph showing changes in flux density in the poles of the magnetic bearing apparatuses in FIG. 7.

FIG. 17 consists of graphs showing the results of calculations giving the distribution of the flux density in the gap, and shows variations in the flux density in the case where no current is flowing through the electromagnets 18, 19 and in the case of a current (where "A" refers to Amps) $-2.0$ (A) and $+2.0$ (A) and flowing therethrough. It will be appreciated from this drawing that a change in a current flowing through the electromagnets 18, 19 does not affect the flux density in the non-controlling poles 26, 27, but gives rise to a change in the flux density in the controlling poles 24, 25.

Figure 18:
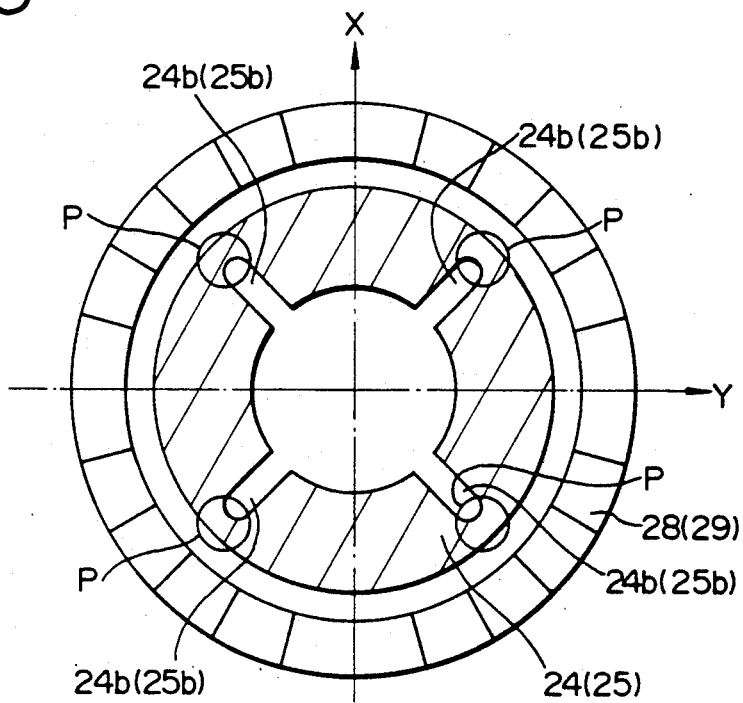
FIG. 18 is a transverse sectional view of a modification of the control magnetic pole of the magnetic bearing apparatuses in FIG. 7.

In order to inhibit the controlling flux for varying the flux density from flowing into adjacent controlling poles, the controlling poles 24, 25 are formed with radial notches 24b (25b), as shown in FIG. 18, thereby causing the biasing flux to be saturated in pole portions P between the controlling poles to inhibit the controlling flux from flowing into the adjacent poles.

Figure 19A:
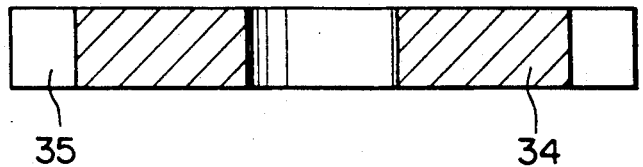
FIGS. 19($a$), ($b$) and ($c$) are transverse and longitudinal sectional views of a modification of the biasing magnet of the magnetic bearing apparatuses in FIG. 7.
Figure 19B:
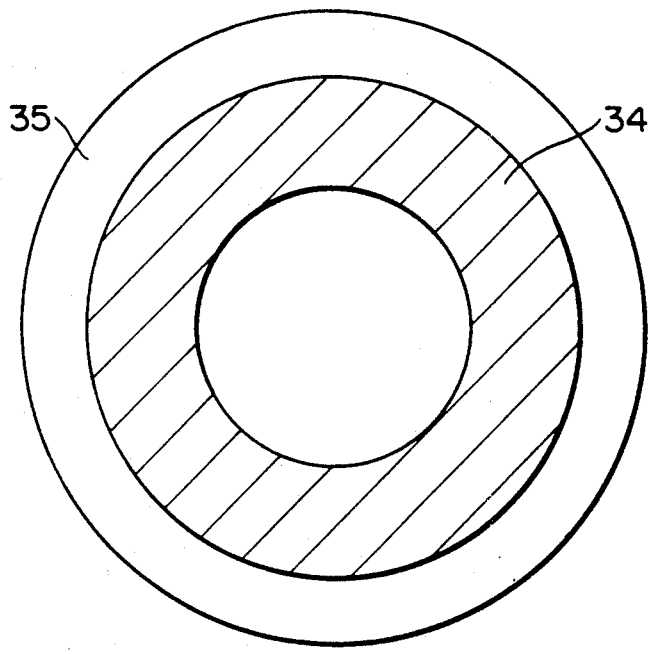
Figure 19C:
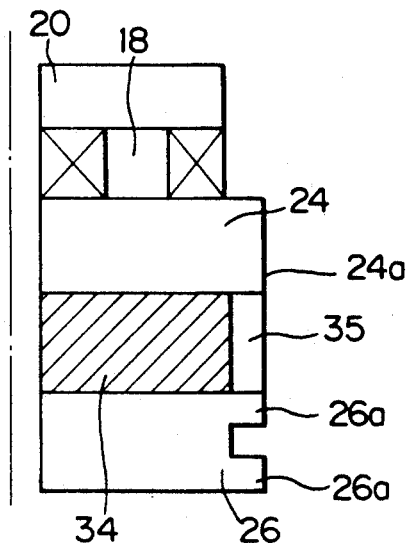
Figure 20:
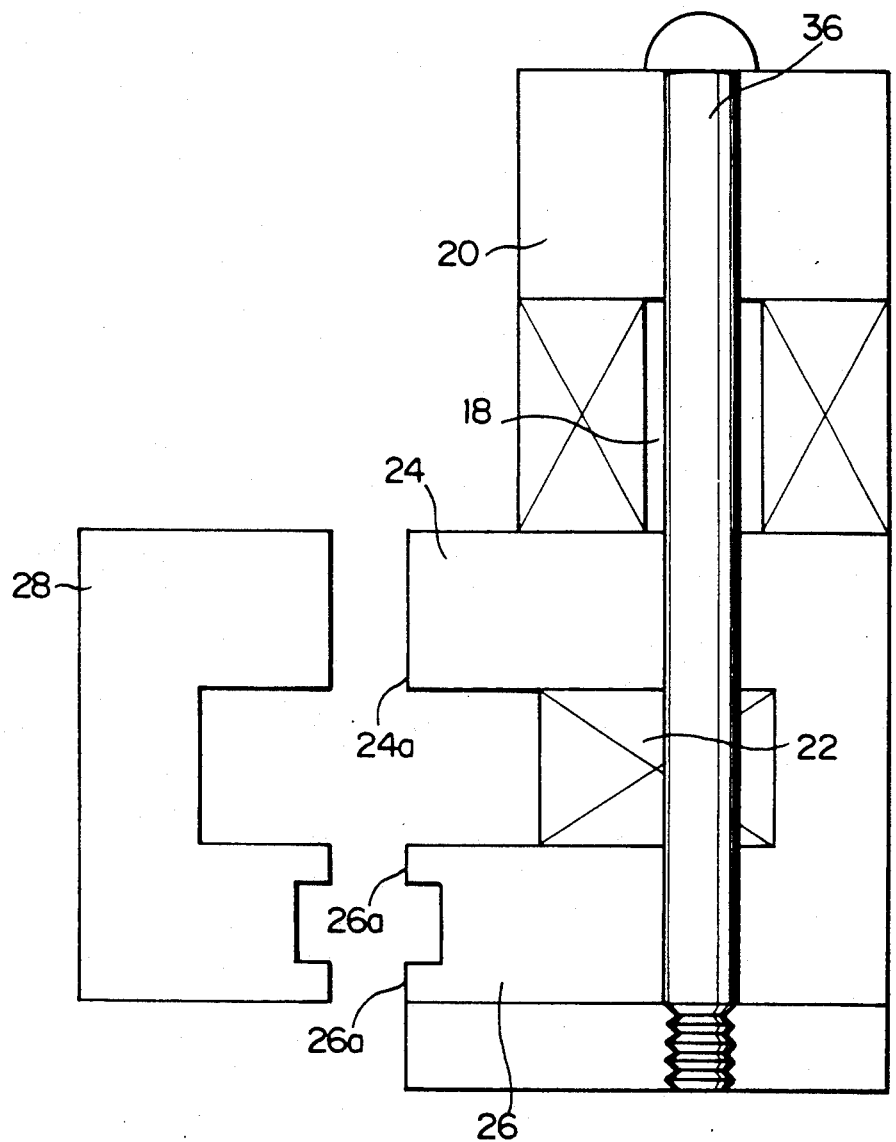
FIG. 20 shows an example of how to assemble the controlling magnet and the bias and non-controlling magnetic poles.

In the embodiment of the magnetic bearing system as described above, the biasing fluxes are provided by the annular electromagnets or permanent magnets 22, 23, but the permanent magnets are extremely delicate and brittle and may attract debris, such as iron particles, in handling. Thus, a ring 35 of a non-magnetic material, such as aluminium, can be mounted on the outer periphery of the permanent magnet 34 to protect it, as shown in FIGS. 19(a)-(c). This makes the assembly of the magnetic bearing apparatus easy and reduces the risk of problems occuring. Since the magnetic bearing apparatus of FIG. 7 has a relatively large number of components including the yokes 20, 21, the electromagnets 18, 19, the controlling magnetic poles 24, 25, the electromagnets (permanent magnets) 22, 23 and the non-controlling magnetic poles 26, 27, they can be fixed together by a tie rod 36, as same components are shown fixed together in FIG. 20, to facilitate assembly of the components and incorporation of them into the apparatus. This not only improves the workability, but also enhances the positioning of the poles and the accuracy of the size thereof.

The invention has been described in detail with particular reference to a certain preferred embodiment thereof, but it will be understood that variations and modifications can be effected within the spirit and scope of the invention. For example, the present invention should be understood to include an inner-rotor type magnetic bearing apparatus and a system using it, because the inner-rotor type and outer-rotor type magnetic bearings are equivalent.

What is claimed is:

1. A system for supporting a rotor rotatably relative to a stator having a longitudinal axis and without contact with the stator and controlling a position of said rotor on at least one control axis, said system comprising:

a motor means mounted on said stator for rotating said rotor; and a magnetic bearing apparatus mounted on said stator for rotatably supporting said rotor relative to said stator and including:

a controlling magnet means fixed to a peripheral portion of said stator for generating a controlling magnetic flux to exert a magnetic force on said rotor so as to support said rotor in a neutral position;

a non-controlling magnetic pole means fixed to the peripheral portion of said stator;

a biasing magnetic pole means fixed to said stator and positioned between said controlling magnet means and said non-controlling magnetic pole means for generating and supplying a biasing magnetic flux to said controlling magnet means to linearize control of a position of said rotor; said biasing magnetic pole means being sandwiched between said controlling magnet means and said non-controlling magnetic pole means, thereby inhibiting an eddy current from being generated in said rotor; and said biasing magnetic pole means comprising an annular permanent magnet and a non-magnetic ring covering the periphery of said annular permanent magnet; and a rotor magnetic pole means fixed to said rotor to face said controlling magnet means and said non-controlling and biasing magnetic pole means, thereby forming a magnetic path for the biasing magnetic flux running in a plane which includes the longitudinal axis of said stator.

2. System as set forth in claim 1 wherein said controlling magnet means comprises an annular electromagnet and a first annular magnetic pole, and said non-controlling magnetic pole means comprises a second annular magnetic pole, said first and second annular magnetic poles being provided to sandwich said biasing magnetic pole means.

3. System as set forth in claim 2 wherein said biasing magnetic pole means comprises at least one of a permanent magnet and an electromagnet.

4. System as set forth in claim 2 wherein said first annular magnetic pole includes a plurality of radial notches.

5. System as set forth in claim 2 wherein said annular electromagnet is driven by a push-pull current amplifier.

6. System as set forth in claim 2 wherein the flux density ranges from 0.4 Tesla to 0.6 Tesla at said first annular magnetic pole means and the flux density ranges from 0.8 Tesla to 1.2 Tesla at said second annular magnetic pole means.

7. System as set forth in claim 2 wherein said biasing magnetic pole means and said first and second annular magnetic poles are integrally assembled.

8. System as set forth in claim 1 further comprising a sensor means for sensing a radial displacement of said rotor.

9. A system for supporting a rotor rotatably relative to a stator having a longitudinal axis and without contact with the stator and controlling the position of said rotor on at least one control axis, said system comprising:

a motor means mounted on said stator for rotating said rotor; and a magnetic bearing apparatus mounted on said stator for rotatably supporting said rotor relative to said stator and including:

a controlling magnet means fixed to a peripheral portion of said stator for generating a controlling magnetic flux to exert a magnetic force on said rotor so as to support said rotor in a neutral position; a non-controlling magnetic pole means fixed to the peripheral portion of said stator and having at least two first teeth on one surface thereof;

a biasing magnetic pole means fixed to said stator and positioned between said controlling magnet means and said non-controlling magnetic pole means for generating and supplying a biasing magnetic flux to said controlling magnet means to linearize control of a position of said rotor; and a rotor magnetic pole means fixed to said rotor and having at least two second teeth on one surface thereof to face said first teeth of said non-controlling magnetic pole means, said biasing magnetic flux passing through a magnetic path formed by said controlling magnet means and each of said non-controlling magnetic pole means, said biasing magnetic pole means, and said rotor magnetic pole means and the gap between said first and second teeth, said magnetic path running in a plane which includes the longitudinal axis of said stator, thereby utilizing said biasing magnetic flux between said first and second teeth for recovering a longitudinal displacement of said rotor.

10. System as set forth in claim 9 wherein said controlling magnet means comprises a control electromagnet positioned perpendicular to the radial direction of said rotor to generate a controlling magnetic flux and a controlling magnetic pole means receiving the controlling magnetic flux to exert a radial magnetic attractive force on said rotor, and wherein a magnetic path for said controlling magnetic flux is partially common to the magnetic path for said biasing magnetic flux in said controlling magnet means.

11. System as set forth in claim 10 wherein said controlling magnetic pole means and said non-controlling magnetic pole means are annular and are disposed to receive said biasing magnetic pole means therebetween.

12. System as set forth in claim 10 wherein said control electromagnet is formed such that the cross section thereof includes a straight side and an arc-shaped side connecting the ends of the straight side.

13. System as set forth in claim 10 wherein said biasing magnetic pole means comprises an annular permanent magnet.

14. System as set forth in claim 13 wherein one side surface of said permanent magnet is provided with a non-magnetic member to protect said permanent magnet.

15. System as set forth in claim 10 wherein said biasing magnetic pole means comprises an annular electromagnet.

16. System as set forth in claim 10 further comprising a sensor means for sensing a radial displacement of said rotor.

17. A magnetic bearing apparatus for rotatably supporting a rotor in a non-contact state relative to a stator having a longitudinal axis and controlling the position of the rotor on at least one control axis, said apparatus comprising:

a controlling magnet means fixed to a peripheral portion of said stator for generating a controlling magnetic flux to exert a magnetic force on said rotor so as to support said rotor in a neutral position;

a non-controlling magnetic pole means fixed to the peripheral portion of said stator;

a biasing magnetic pole means fixed to said stator and positioned between said controlling magnet means and said non-controlling magnetic pole means for generating and supplying a biasing magnetic flux to said controlling magnet means to linearize control of the position of said rotor; and a rotor magnetic pole means fixed to said rotor to face said controlling magnet means and said non-controlling and biasing magnetic pole means, thereby forming a magnetic path of said biasing magnetic flux running in a plane which includes the longitudinal axis of said stator.

18. Apparatus as set forth in claim 17 wherein said biasing magnetic pole means is sandwiched between said controlling magnet means and said non-controlling magnetic pole means, thereby inhibiting an eddy current from being generated in said rotor.

19. Apparatus as set forth in claim 18 wherein said controlling magnet means comprises an annular electromagnet and a first annular magnetic pole means, and said non-controlling magnetic pole means comprises a second annular magnetic pole means, said first and second annular magnetic pole means being provided to sandwich said biasing magnetic pole means.

20. Apparatus as set forth in claim 18 wherein said biasing magnetic pole means comprises a permanent magnet or an electromagnet.

21. A magnetic bearing apparatus for supporting a rotor rotatably relative to a stator having a longitudinal axis and without contact with the stator and controlling the position of the rotor on at least one control axis, said apparatus comprising:

a controlling magnet means fixed to a peripheral portion of said stator for generating a controlling magnetic flux to exert a magnetic force on said rotor so as to support said rotor in a neutral position;

a non-controlling magnetic pole means fixed to said peripheral portion of said stator and having at least two first teeth on one surface thereof;

a biasing magnetic pole means fixed to said stator and positioned between said controlling magnet means and said non-controlling magnetic pole means for generating and supplying a biasing magnetic flux to said controlling magnet means to linearize control of a position of said rotor; and a rotor magnetic pole means fixed to said rotor and having at least two second teeth on one surface thereof to face said first teeth of said non-controlling magnetic pole means, said biasing magnetic flux passing through a magnetic path formed by said controlling magnet means and each of said non-controlling magnetic pole means, said biasing magnetic pole means, and said rotor magnetic pole means and the gap between said first and second teeth, said magnetic path running in a plane which includes the longitudinal axis of said stator, thereby utilizing the magnetic flux between said first and second teeth as a magnetic flux for recovering a longitudinal displacement of said rotor.

22. Apparatus as set forth in claim 21 wherein said controlling magnet means comprises a control electromagnet positioned perpendicularly to the radial direction of said rotor to generate a controlling magnetic flux and a controlling magnetic pole means receiving the controlling magnetic flux to exert a radial magnetic attractive force on said rotor, and wherein a magnetic path of said controlling magnetic flux is partially common to the magnetic path of said biasing magnetic flux in said controlling magnetic pole means.

23. Apparatus as set forth in claim 22 wherein said controlling magnet means and said non-controlling magnetic pole means are annular and are disposed to receive said biasing magnetic pole means therebetween.

24. Apparatus as set forth in claim 22 wherein said control electromagnet is formed such that the cross section thereof includes a straight side and an arc-shaped side connecting the ends of the straight side.

25. Apparatus as set forth in claim 22 wherein said biasing magnetic pole means comprises an annular permanent magnet.

26. Apparatus as set forth in claim 25 wherein one surface of said permanent magnet is provided with a non-magnetic member to protect said permanent magnet.

27. Apparatus as set forth in claim 22 wherein said biasing magnetic pole means comprises an annular electromagnet.

28. A system for supporting a rotor rotatably relative to a stator having a longitudinal axis and without contact with the stator and controlling a position of said rotor on at least one control axis, said system comprising:

a motor means mounted on said stator for rotating said rotor; and a magnetic bearing apparatus mounted on said stator for rotatably supporting said rotor relative to said stator and including:

a controlling magnet means fixed to a peripheral portion of said stator for generating a controlling magnetic flux to exert a magnetic force on said rotor so as to support said rotor in a neutral position;

a non-controlling magnetic pole means fixed to the peripheral portion of said stator;

a biasing magnetic pole means fixed to said stator and positioned between said controlling magnet means and said non-controlling magnetic pole means for generating and supplying a biasing magnetic flux to said controlling magnet means to linearize control of a position of said rotor; said biasing magnetic pole means being sandwiched between said controlling magnet means and said non-controlling magnetic pole means, thereby inhibiting an eddy current from being generated in said rotor; and said biasing magnetic pole means comprising an electromagnet; and a rotor magnetic pole means fixed to said rotor to face said controlling magnet means and said non-controlling and biasing magnetic pole means, thereby forming a magnetic path for the biasing magnetic flux running in a plane which includes the longitudinal axis of said stator.

* * * * *